United States Patent
Duan et al.

(10) Patent No.: US 12,442,885 B2
(45) Date of Patent: Oct. 14, 2025

(54) DOPPLER ERROR GROUPS FOR CELLULAR-BASED RADIO FREQUENCY SENSING

(71) Applicant: QUALCOMM Incorporated, San Diego, CA (US)

(72) Inventors: Weimin Duan, San Diego, CA (US); Hyojin Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 428 days.

(21) Appl. No.: 18/173,012

(22) Filed: Feb. 22, 2023

(65) Prior Publication Data

US 2024/0280661 A1    Aug. 22, 2024

(51) Int. Cl.
G01S 5/02    (2010.01)
G01S 5/00    (2006.01)
H04L 25/02   (2006.01)

(52) U.S. Cl.
CPC .......... G01S 5/0246 (2020.05); G01S 5/0036 (2013.01); H04L 25/0222 (2013.01)

(58) Field of Classification Search
CPC ... G01S 5/0246; G01S 5/0036; H04L 25/0222
See application file for complete search history.

(56) References Cited

U.S. PATENT DOCUMENTS

2021/0076417 A1   3/2021   Bayesteh et al.
2023/0055363 A1*  2/2023   Su ............................ G01S 19/23

FOREIGN PATENT DOCUMENTS

WO   9815070 A1      4/1998
WO   2022056242 A1   3/2022

OTHER PUBLICATIONS

International Search Report and Written Opinion—PCT/US2024/014430—ISA/EPO—Apr. 29, 2024.

* cited by examiner

*Primary Examiner* — Curtis B Odom
(74) *Attorney, Agent, or Firm* — QUALCOMM Incorporated

(57) ABSTRACT

In an aspect, a wireless entity may transmit a first indication of one or more Doppler error group (DEG) identifiers (IDs) corresponding to one or more DEGs supported by the wireless entity, where each of the one or more DEGs is associated with a hardware configuration or an operational state of the wireless entity. The wireless entity may transmit a first set of measurements associated with a DEG ID of the one or more DEG IDs.

30 Claims, 10 Drawing Sheets

DOPPLER ERROR GROUPS FOR CELLULAR-BASED RADIO FREQUENCY SENSING

TECHNICAL FIELD

The present disclosure relates generally to positioning systems, and more particularly, to positioning systems involving radio frequency sensing.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may include memory and at least one processor coupled to the memory. The at least one processor, based at least in part on information stored in the memory may be configured to transmit a first indication of one or more Doppler error group (DEG) identifiers (IDs) corresponding to one or more DEGs supported by the wireless entity, where each of the DEG(s) is associated with a hardware configuration or an operational state of the wireless entity, and to transmit a set of measurements associated with a DEG ID of the DEG ID(s).

In another aspect of the disclosure, a method, a computer-readable medium, and an apparatus are provided. The apparatus may include memory and at least one processor coupled to the memory. The at least one processor, based at least in part on information stored in the memory may be configured to receive an indication of DEG ID(s) corresponding to DEG(s) supported by a wireless entity, where each of the DEG(s) is associated with a hardware configuration or an operational state of the wireless entity, to receive a set of measurements associated with a DEG ID of the DEG ID(s), and to derive a sensing result based at least partially on the DEG ID.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
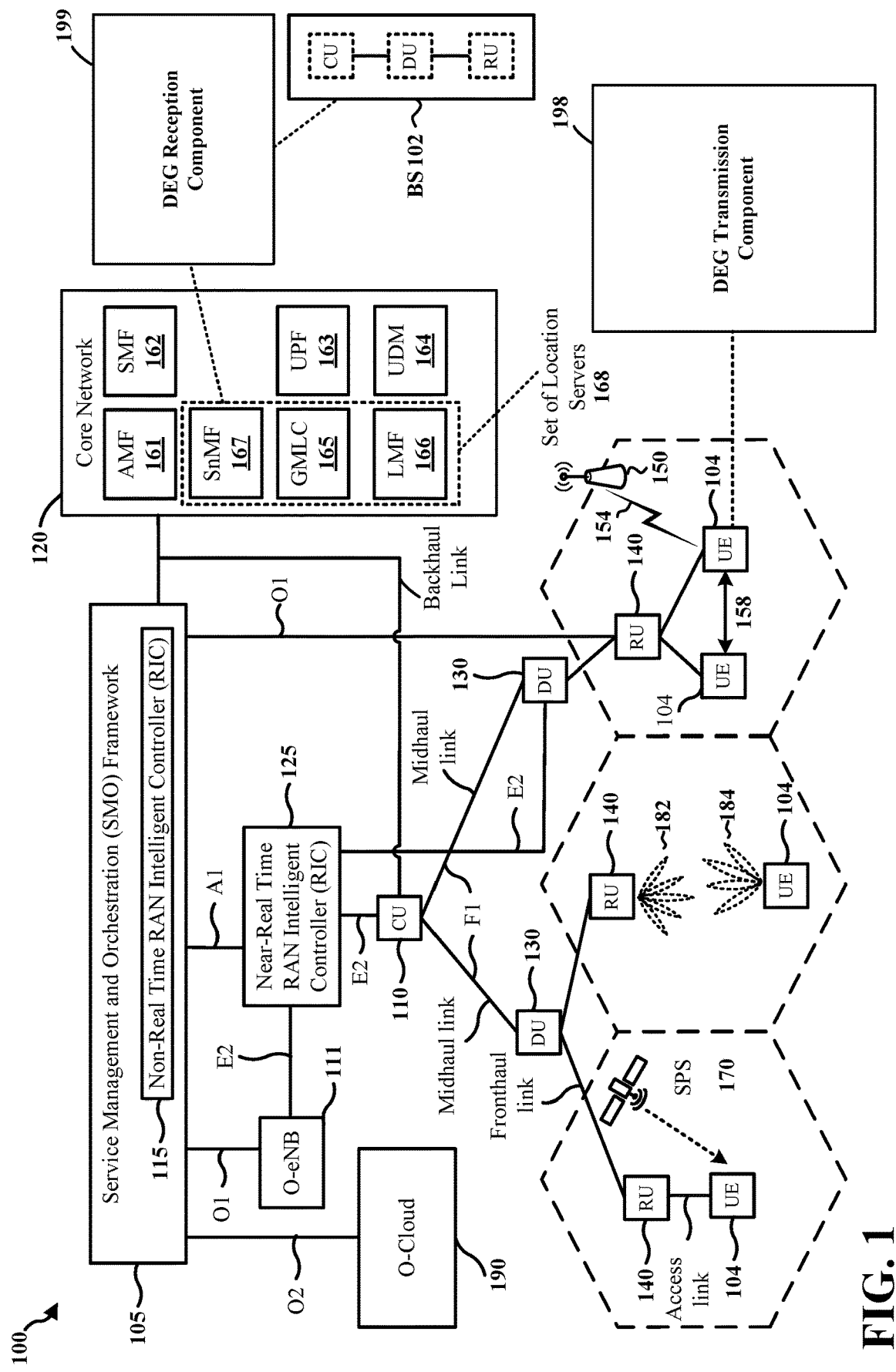
FIG. 1 is a diagram illustrating an example of a wireless communications system and an access network.

Various aspects relate generally to positioning systems. Some aspects more specifically relate to radio frequency (RF) sensing utilizing one or more Doppler error groups (DEGs). In some examples, a wireless entity (e.g., a sensing node) may provide an indication of one or more DEG identifiers (IDs) corresponding to DEG(s) supported by the wireless entity. Each of the DEG ID(s) indicates a particular hardware configuration (e.g., an indication of one or more oscillators utilized by the wireless entity) and/or an operational state supported by the wireless entity. The wireless entity may perform a set of measurements for a target entity. The wireless entity may provide the set of measurements to a network entity (e.g., a base station, a network node, a sensing management function (SnMF), etc.), along with a particular DEG ID that identifies the DEG (or hardware configuration and/or operational state) utilized when performing the set of measurements. The network entity may derive a sensing result (e.g., a position, a velocity, etc.) for a target entity based at least on the DEG ID (e.g., based on the DEG ID and the set of measurements).

Particular aspects of the subject matter described in this disclosure can be implemented to realize one or more of the following potential advantages. In some examples, by deriving the sensing result based on the DEG ID, the network entity may determine the hardware configuration and/or operational state of the wireless entity and accurately remove the estimation bias caused by the oscillator error associated with the hardware configuration and/or operational state. By doing so, the network entity may more accurately estimate the Doppler shift of the target entity, and therefore, more accurately determine a sensing result for the target entity.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.)

may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUs 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth, Wi-Fi based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHZ-52.6 GHZ). Although a portion of FR1 is greater than 6 GHZ, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHz-71 GHz), FR4 (71 GHz-114.25 GHZ), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHz, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166, and a Sensing Management Function (SnMF) 167. However, generally, the one or more location servers 168 may include one or more location/positioning servers, which may include one or more of the GMLC 165, the LMF 166, the SnMF 167, a position determination entity (PDE), a serving mobile location center (SMLC), a mobile positioning center (MPC), or the like. The GMLC 165, the LMF 166, and the SnMF 167 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The SnMF 167 receives measurements and/or additional information from a sensing node and determines a sensing result (e.g., a position of a target entity) based on the measurements and/or additional information. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may have a DEG transmission component 198 that may be configured to transmit a first indication of DEG ID(s) corresponding to DEG(s) supported by the wireless entity, where each of the DEG(s) is associated with a hardware configuration or an operational state of the wireless entity, and to transmit a first set of measurements associated with a DEG ID of the DEG ID(s). In certain aspects, the base station 102 and/or the SnMF 167 may have a DEG reception component 199 that may be configured to receive an indication of DEG ID(s) corresponding to DEG(s) supported by a wireless entity, where each of the DEG(s) is associated with a hardware configuration or an operational state of the wireless entity, to receive a set of measurements associated with a DEG ID of the DEG ID(s), and to derive a sensing result based at least partially on the DEG ID.

Figure 2:
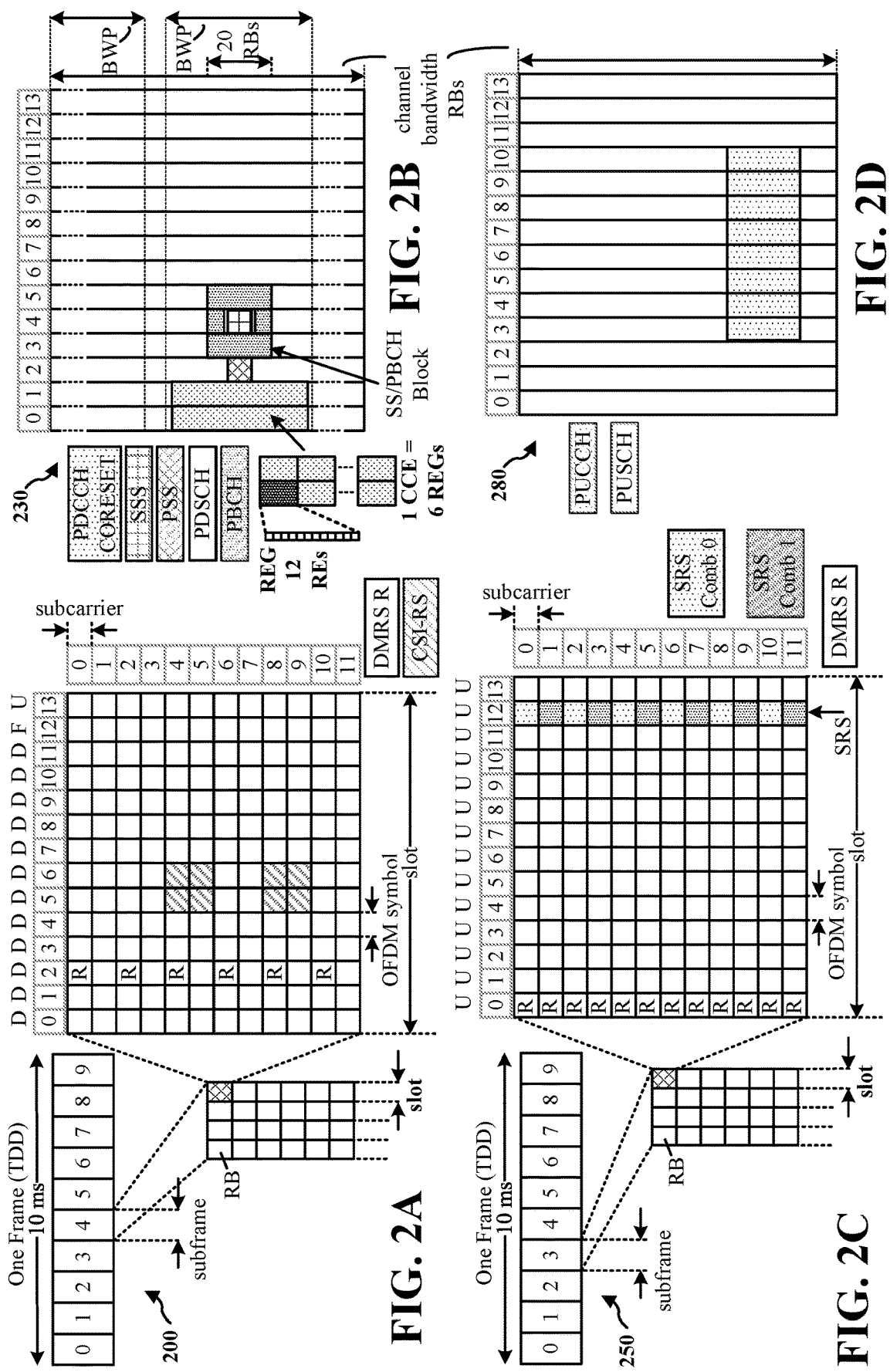
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS $\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
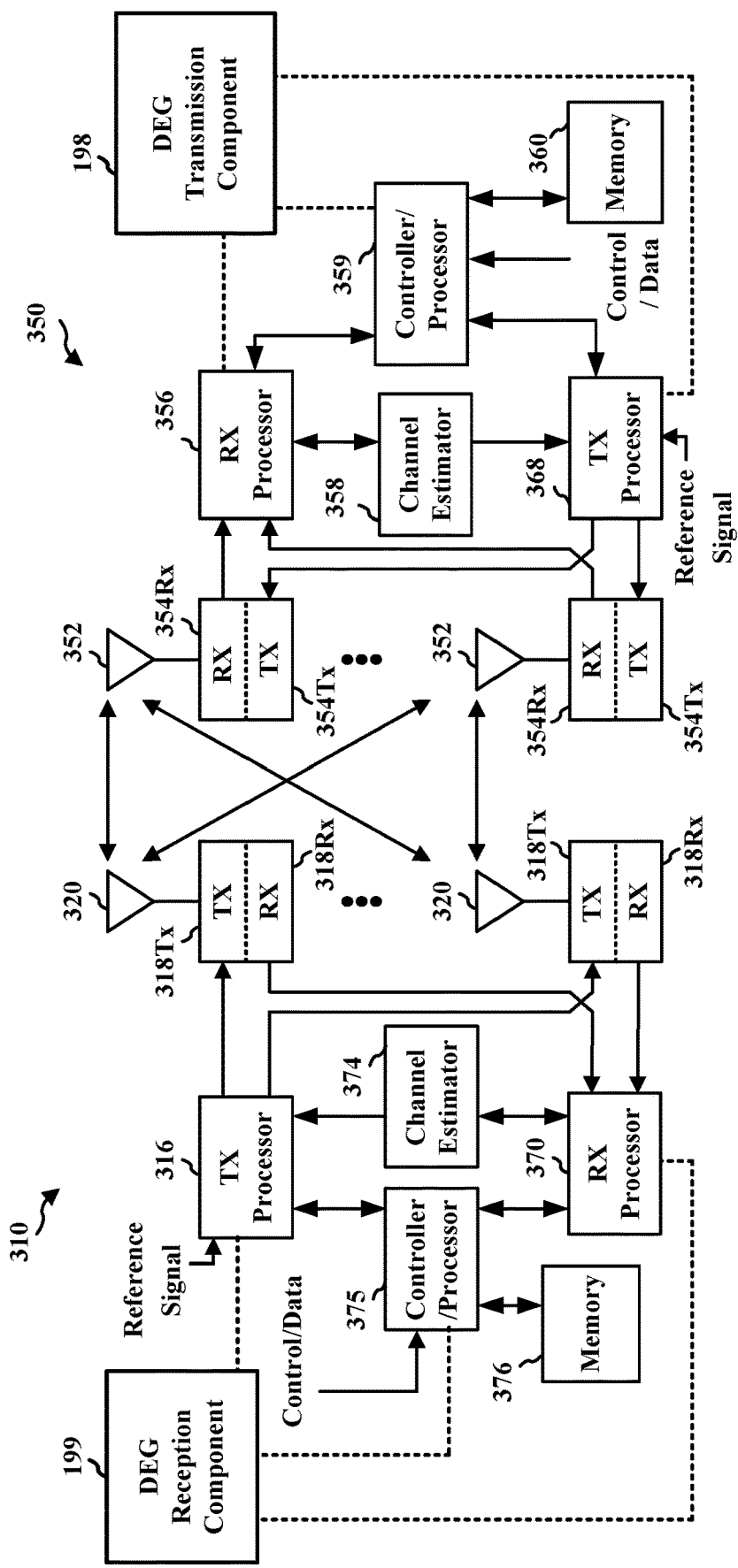
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the DEG transmission component 198 of FIG. 1.

At least one of the TX processor 316, the RX processor 370, and the controller/processor 375 may be configured to perform aspects in connection with the DEG reception component 199 of FIG. 1.

Figure 4:
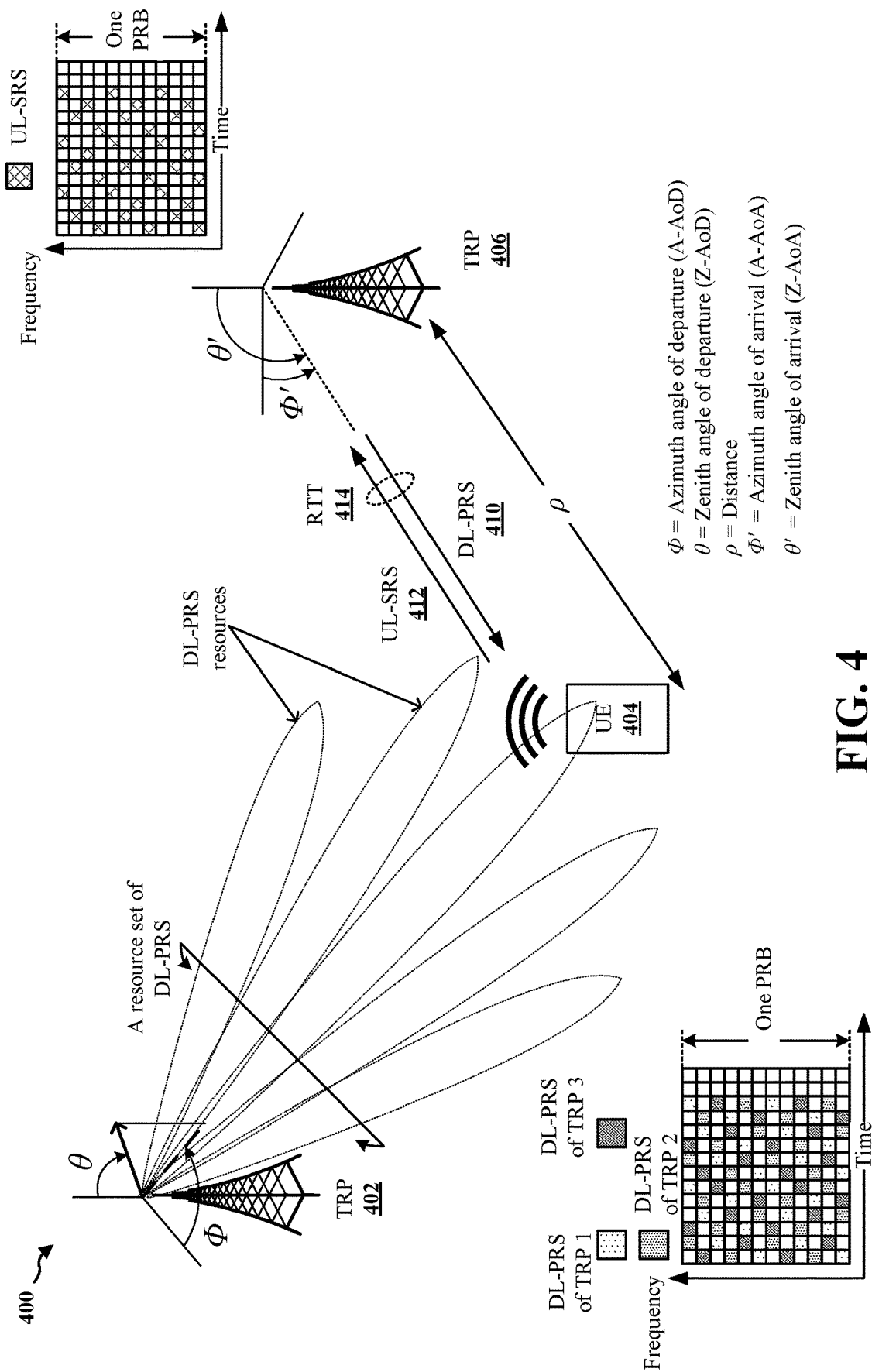
FIG. 4 is a diagram illustrating an example of a UE positioning based on reference signal measurements.

FIG. 4 is a diagram 400 illustrating an example of a UE positioning based on reference signal measurements. The UE 404 may transmit UL-SRS 412 at time $T_{SRS\_TX}$ and receive DL positioning reference signals (PRS) (DL-PRS) 410 at time $T_{PRS\_RX}$. The TRP 406 may receive the UL-SRS 412 at time $T_{SRS\_RX}$ and transmit the DL-PRS 410 at time $T_{PRS\_TX}$. The UE 404 may receive the DL-PRS 410 before transmitting the UL-SRS 412, or may transmit the UL-SRS 412 before receiving the DL-PRS 410. In both cases, a positioning server (e.g., location server(s)168) or the UE 404 may determine the RTT 414 based on $\|T_{SRS\_RX} - T_{PRS\_TX}\| - |T_{SRS\_TX} - T_{PRS\_RX}\|$. Accordingly, multi-RTT positioning may make use of the UE Rx-Tx time difference measurements (i.e., $|T_{SRS\_TX} - T_{PRS\_RX}|$) and DL-PRS reference signal received power (RSRP) (DL-PRS-RSRP) of downlink signals received from multiple TRPs 402, 406 and measured by the UE 404, and the measured TRP Rx-Tx time difference measurements (i.e., $|T_{SRS\_RX} - T_{PRS\_TX}|$) and UL-SRS-RSRP at multiple TRPs 402, 406 of uplink signals transmitted from UE 404. The UE 404 measures the UE Rx-Tx time difference measurements (and optionally DL-PRS-RSRP of the received signals) using assistance data received from the positioning server, and the TRPs 402, 406 measure the gNB Rx-Tx time difference measurements (and optionally UL-SRS-RSRP of the received signals) using assistance data received from the positioning server. The measurements may be used at the positioning server or the UE 404 to determine the RTT, which is used to estimate the location of the UE 404. Other methods are possible for determining the RTT, such as for example using DL-TDOA and/or UL-TDOA measurements.

DL-AoD positioning may make use of the measured DL-PRS-RSRP of downlink signals received from multiple TRPs 402, 406 at the UE 404. The UE 404 measures the DL-PRS-RSRP of the received signals using assistance data received from the positioning server, and the resulting measurements are used along with the azimuth angle of departure (A-AoD), the zenith angle of departure (Z-AoD), and other configuration information to locate the UE 404 in relation to the neighboring TRPs 402, 406.

DL-TDOA positioning may make use of the DL reference signal time difference (RSTD) (and optionally DL-PRS-RSRP) of downlink signals received from multiple TRPs 402, 406 at the UE 404. The UE 404 measures the DL RSTD (and optionally DL-PRS-RSRP) of the received signals using assistance data received from the positioning server, and the resulting measurements are used along with other configuration information to locate the UE 404 in relation to the neighboring TRPs 402, 406.

UL-TDOA positioning may make use of the UL relative time of arrival (RTOA) (and optionally UL-SRS-RSRP) at multiple TRPs 402, 406 of uplink signals transmitted from UE 404. The TRPs 402, 406 measure the UL-RTOA (and optionally UL-SRS-RSRP) of the received signals using assistance data received from the positioning server, and the resulting measurements are used along with other configuration information to estimate the location of the UE 404.

UL-AoA positioning may make use of the measured azimuth angle of arrival (A-AoA) and zenith angle of arrival (Z-AoA) at multiple TRPs 402, 406 of uplink signals transmitted from the UE 404. The TRPs 402, 406 measure the A-AoA and the Z-AoA of the received signals using assistance data received from the positioning server, and the resulting measurements are used along with other configuration information to estimate the location of the UE 404.

Additional positioning methods may be used for estimating the location of the UE 404, such as for example, UE-side UL-AoD and/or DL-AoA. Note that data/measurements from various technologies may be combined in various ways to increase accuracy, to determine and/or to enhance certainty, to supplement/complement measurements, and/or to substitute/provide for missing information.

In addition to network-based UE positioning technologies, a wireless device (e.g., a UE, an access point (AP), etc.) may also be configured to include sensing capabilities, where the wireless device may be able to sense (e.g., detect and/or track) one or more objects of an area or in an environment based on radio frequencies. An environment may refer to a particular geographical area or place, especially as affected by human activity, or the circumstances, objects, or conditions by which one is surrounded. For example, a wireless device may include a radar capability (which may be referred to as "RF sensing" and/or "cellular-based RF sensing"), where the wireless device may transmit reference signals (e.g., radar reference signals (RRSs)) and measure the reference signals reflected from one or more objects (e.g., structures, walls, living objects, and/or things in an environment, etc.). Based on the measurement, the wireless device may determine or estimate a distance between the wireless device and the one or more objects and/or obtain environmental information associated with its surrounding. In another example, a first wireless device may receive signals transmitted from a second wireless device, where the first wireless device may determine or estimate a distance between the first wireless device and the second wireless device based on the received signals. For example, a tracking device (e.g., a Bluetooth tracker, an item tracker, an asset tracking device, etc.) may be configured to regularly transmit signals (e.g., beacon signals) or small amounts of data to a receiving device, such that the receiving device may be able to monitor the location or the relative distance of the tracking device. As such, a user may be able to track the location of an item (e.g., a car key, a wallet, a remote control, etc.) by attaching the tracking device to the item. For purposes of the present disclosure, a device/apparatus that is capable of performing sensing (e.g., transmitting and/or receiving signals for detecting at least one object or for estimating the distance between the device and the at least one object) may be referred to as a "sensing device" or a "sensing node." For example, a sensing device may be a UE, an AP device (e.g., a Wi-Fi router), a base station, a component of the base station, a TRP, a device capable of performing radar functions, etc. In addition, a device/apparatus that is capable of transmitting signals to a sensing device for the sensing device to determine the location or the relative distance of the device/apparatus may be referred to as a "tracking device," a "tracker," or a "tag."

In practice, the transmitting device and/or receiving device in a sensing system may include an oscillator error. For example, oscillators in such devices are typically not temperature controlled, and therefore, may introduce sizable errors in the generated frequency, which varies throughout the day depending on the temperature. Other sources may also contribute to oscillator errors. Accordingly, when a frequency offset of an RF sensing signal received by a device, such as a UE, is measured by the UE, the frequency offset includes not just the Doppler shift induced by the target object, but also a sizable oscillator error. Similarly, the frequency offset of an RF sensing signal that was transmitted by a UE and received by another device, such as a base station, will also include not just the Doppler shift induced by the target object, but also the oscillator error caused by the oscillator of the base station.

In wireless communications, the receiving device does not attempt to distinguish the Doppler shift from the oscillator errors. In wireless communications, the sum of the Doppler shift and oscillator error are estimated and compensated for by employing frequency tracking loop (FTL), which leads to satisfactory modem performance.

However, for RF sensing, it is desirable to accurately determine the Doppler shift introduced by the target object in order to determine the motion of the target object itself. Aspects of the present disclosure are directed to mitigating the Doppler measurement error in RF sensing, for example, by removing the estimation bias caused by the oscillator error from the total frequency offset estimate (including both Doppler shift and oscillator error) in order to obtain accurate Doppler shift estimates.

Sensing nodes may use different groups of transmit chains (that utilize a first set of one or more oscillators) and receive chains (that utilize a second set of one or more oscillators). For example, a first sensing node may include a first transmit chain that utilizes a first set of oscillator(s) and may include a first receive chain that utilizes a second set of oscillator(s), and a second sensing node may include a second transmit chain that utilizes a third set of oscillator(s) and may include a second receive chain that utilizes a fourth set of oscillator(s). In some aspects, a sensing node may utilize the same oscillators for both its transmit chain and receive chain. In other aspects, a sensing node may utilize different oscillators for its transmit chain and receive chain.

A sensing node may perform measurements based on reference signal(s) received thereby. From the measurements, the sensing node may identify clustered Doppler measurements utilizing the same received samples. This is mainly due to utilizing different hardware (e.g., of its receive chain) to process the same received samples.

The hardware difference may be from the usage of different oscillators. For instance, some hardware architectures may be designed/utilized for particular purposes or as a cost-savings measure. Even if the same set of hardware is utilized, the clustered Doppler measurement error may vary over different operational states. For example, if the sensing node switches form a power savings mode to a regular (or normal) mode, the hardware configuration may change. For instance, the sensing node may switch from utilizing a power efficient oscillator to a standard oscillator (e.g., when switching to the normal mode), or vice versa (e.g., when switching to the power savings mode).

In accordance with various aspects of the present disclosure, one or more Doppler error groups (DEGs) may be defined and utilized in cellular systems for RF sensing purposes. The DEGs may be motivated by the strong correlation between the hardware architecture and configurations and/or the operational state of the sensing node. Each of the DEGs represent a Doppler error attributed to particular hardware configuration and/or operational state of a sensing node utilized when performing positioning and/or sensing measurements. In some aspects, the hardware configuration corresponds to the oscillators for the transmit chain and the receive chain of the sensing node. In some aspects, the operational state may correspond to at least one of a power state (e.g., a power on state (or mode), a low power state (or power savings mode), a standby state (or mode)) of the sensing node or a temperature (or temperature range) of the sensing node.

A sensing node may be associated with one or more DEGs. For example, a sensing node may be associated with a transmit DEG. The transmit DEG may be correlated to the hardware configuration selection (e.g., selection of hardware components) for the transmit chain of the sensing node. In another example, a sensing node may be associated with a receive DEG. The receive DEG may be correlated to the hardware configuration selection (e.g., selection of hardware components) for the receive chain of the sensing node. In a further example, a sensing node may be associated with a transmit-receive DEG. The transmit-receive DEG may be correlated to the hardware configuration selection (e.g., selection of hardware components) for both the transmit chain and the receive chain of the sensing node. In yet a further example, a sensing node may be associated with a temperature-based DEG, where the DEG is correlated with one or more operating temperatures of the sensing node (e.g., if the sensing node is equipped with a temperature sensor). In a further example, a sensing node may be associated with a carrier component-based DEG, where the DEG corresponds to a carrier component by which the DEG transmits and/or receives signals. A carrier component-based DEG may be per carrier component. That is, a sensing node may be associated with a plurality of carrier component-based DEGs, where each such DEG corresponds to a particular carrier component utilized by the sensing node.

A sensing node may be configured to indicate the DEG(s) associated therewith, for example, to a network node or a UE. By indicating its DEG(s), the sensing node may not need to disclose its particular hardware implementation. However, it is noted that a sensing node may disclose (e.g., signal) its particular hardware implementation, which may be utilized by the core network, a network node, or a UE to implement certain advance features for Doppler measurement error mitigation.

In accordance with various aspects of the present disclosure, enhancements to RF sensing measurement reports are also provided. For example, in some aspects, if the sensing measurement is channel estimation-based (e.g., the sensing node reports the sensing results with a subset of channel taps), multiple channel estimation-based sensing measurements may be reported in a measurement report. Each measurement report may be associated with a particular DEG identifier (ID). The DEG ID may identify the DEG corresponding to the hardware configuration and/or operational state of the sensing node when performing positioning and/or sensing measurements.

In some aspects, if the sensing measurement is per target (e.g., the sensing node reports the sensing results with (e.g., using) target IDs that identify target entities), multiple per target-based sensing measurements may be reported. The sensing node may provide a measurement report for each target entity. Each target-based sensing measurement report may be associated with a particular DEG ID. For example, a measurement report for a particular target entity may be associated with a particular DEG ID of the sensing node.

In some aspects, a network node or UE may determine a sensing result for a target entity based on an analysis of the measurement reports received by one or more sensing nodes. The sensing result may indicate at least one of a change of an environment in which the target entity is included, at least one physiological characteristic of a target entity (e.g., a heart rate, a respiration rate, body temperature, etc.), a location of the target entity, a velocity of the target entity, a heading of the target entity, etc. A target entity may be any object (e.g., a person, a vehicle, a UE, etc.) for which a positioning or sensing session is performed, for example, to determine a location thereof, a velocity thereof, a heading thereof, a physiological characteristic thereof, etc.

In some aspects, a sensing node may report its capability to support a maximum number of DEGs. That is, the sensing node may support a maximum number of DEGs and report the maximum number via capability signaling. To reduce the overhead of the measurement report, the sensing node may down-select to a subset of the supported DEGs to be reported. That is, the sensing node may provide measurement reports for a subset of DEGs supported by the sensing node.

In some aspects, the network may have the minimum amount of DEGs to be reported. That is, the network may be signal to a sensing node a minimum number of DEGs to be reported. The minimum amount of DEGs may be less than the maximum number of DEGs supported by the sensing node.

In some aspects, the sensing node may maintain the coherency of DEGs for a sequence of measurement reports. For example, the sensing node may have different DEGs within particular time window. That is, a particular DEG may be associated with a particular hardware configuration for measurements reported within a particular time window. The sensing node may ensure coherency by not changing (e.g., maintaining) its association between the DEG and the hardware configuration. This is to support certain advanced processing algorithms, such as differential Doppler-based sensing.

In accordance with various aspects of the present disclosure, a DEG-based measurement report may trigger some advanced schemes to mitigate the Doppler measurement error. For example, based on the DEG report, the network may utilize some advanced schemes to mitigate the Doppler measurement. One example advanced scheme may be Doppler-based RF sensing (e.g., frequency difference of arrival (FDOA)-based RF sensing), where the location of a target entity is based on measurements or observations from multiple points. The observation points are in relative motion with respect to each other and the target entity. This relative motion results in different Doppler shift observations of the target entity at each location. The network may trigger this scheme by requesting the sensing node to report the sensing measurement with a particular DEG. This implicitly requests the sensing node to use the same hardware configuration for certain sensing measurement reports. Because each DEG is associated with a certain clustered Doppler measurement error, the different Doppler-based sensing method may remove such common bias.

Another example advanced scheme may be downlink and uplink (i.e., DL+UL) RF bistatic sensing. In accordance with such a scheme, a sensing node may transmit a downlink sensing signal that is reflected by the target object and received by a second sensing node, which measures a first frequency offset that includes an oscillator error from the transmission of the sensing signal and a Doppler shift from the target object. The sensing node may also receive and measure a second frequency offset of a sensing signal transmitted by the second sensing node, reflected by the target object, and received by the sensing node (e.g., as an uplink sensing signal), which includes a second frequency offset that includes an oscillator error from the reception of the sensing signal and a Doppler shift from the target object. The velocity of the object may be estimated based on a combination of the first and second frequency offsets, which cancels the oscillator error caused by the sensing entity.

The RF bistatic sensing may be utilized so long as the sensing node utilizes the same oscillator for its transmit chain and receive chain when performing RF sensing measurements. The RF bistatic sensing scheme may be triggered in many ways. For example, in some aspects, this scheme may be triggered by the sensing node signaling a value of one for the maximum number of DEGs that it supports. This implicitly indicates that a single hardware configuration is supported by the sensing node (i.e., that the same oscillator is used for transmit chain and the receive chain of the sensing node). In some aspects, this scheme may be triggered by defining a particular transmit-receive DEG, which is used when the sensing node uses the same oscillator for its transmit chain and receive chain. That is, the sensing node may signal to the network a particular transmit-receive DEG ID that indicates to the network that the sensing node utilizes the same oscillator for its transmit chain and receive chain. When the sensing node signals such a transmit-receive DEG ID, it implicitly indicates to the network that the RF bistatic sensing technique may be applied for such a sensing node.

Figure 5:
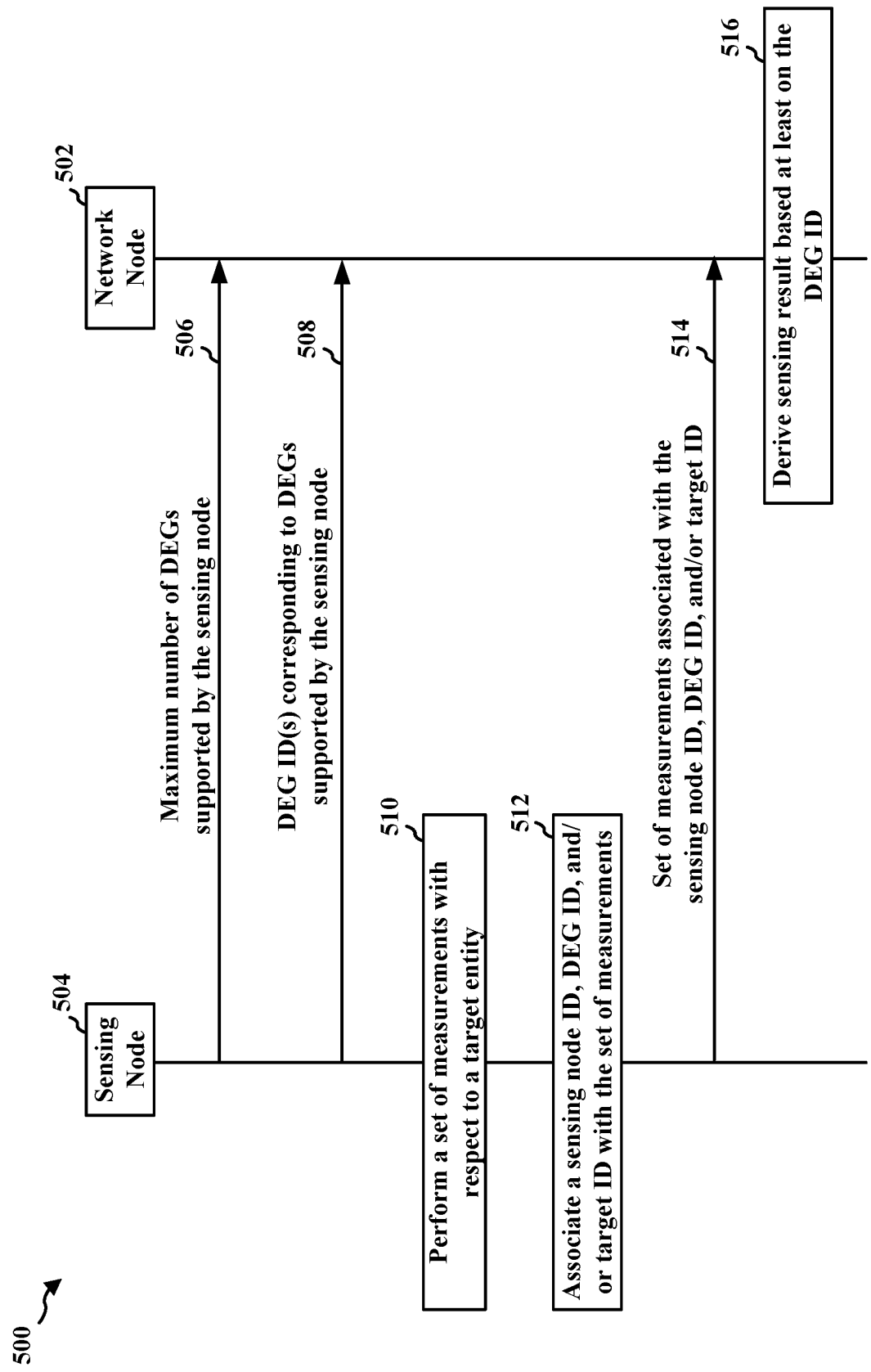
FIG. 5 is a call flow diagram illustrating a method of wireless communication in accordance with various aspects of this present disclosure.

FIG. 5 is a call flow diagram 500 illustrating a method of wireless communication in accordance with various aspects of this present disclosure. As shown in FIG. 5, the diagram 500 includes a network node 502 and a sensing node 504. The network node 502 may be an example of the base station 310, the TRP 402, the TRP 406, or the SnMF 167. The sensing node 504 may be an example of the UE 104, the UE 350, or the UE 404. Although aspects are described for the network node 502, the aspects may be performed by a network node in aggregation and/or by one or more components of the network node 502 (e.g., such as a CU 110, a DU 130, and/or an RU 140). As shown in FIG. 5, at 506, the sensing node 504 may transmit, to the network node 502, capability information that indicates the maximum number of DEGs, supported by the sensing node 504.

At 508, the sensing node 504 may transmit, to the network node 502, an indication of DEG ID(s) corresponding to DEG(s) supported by the sensing node 504. Each of the DEG(s) may be associated with a hardware configuration or an operational state supported by the sensing node 504. In some aspects, the network node 502 may provide, to the sensing node 504, an indication of a minimum number of DEGs to be reported. In such aspects, the number of DEG ID(s) indicated by the sensing node 504 may be less than the maximum number of DEGs supported by the sensing node 504. That is, the sensing node 504 may down-select to a subset of DEGs to report.

In some aspects, the hardware configuration may correspond to at least one of a first oscillator utilized by the sensing node 504 for a transmission of sensing signals or a second oscillator utilized by the sensing node 504 for a reception of the sensing signals. In some aspects, the first and second oscillators may be the same oscillator. In other aspects, the first and second oscillators are different oscillators.

In some aspects, the operational state may correspond to at least one of a power state (e.g., a power on state (or mode), a low power state (or power savings mode), a standby state (or mode)) of the sensing node 504 or a temperature (or temperature range) of the sensing node 504.

At 510, the sensing node 504 may perform a set of measurements with respect to a target entity. For example, the sensing node 504 may receive a sensing signal (e.g., non-line-of-sight (NLOS) signal) that is transmitted from another sensing node (e.g., a UE, a TRP, or the network node 502) and reflected off of the target entity. The sensing node 504 may measure the frequency offset of the reflected signal. As described above, the frequency offset of the sensing signal may include an oscillator error due to transmission of the sensing signal by the sensing node and/or the reception of the sensing signal by the sensing node 504, as well as the Doppler shift caused by the velocity of the target entity. In some implementations, additional parameters may be measured, such as the differential delay, e.g., the ToA difference between a line of sight (LOS) path and echo path.

At 512, the sensing node 504 may associate a sensing node ID, a DEG ID, and/or a target ID with the set of measurements. The sensing node ID may uniquely identify the sensing node 504. Examples of the sensing node ID include, but are not limited to, an international mobile subscriber identity (IMSI), an international mobile equipment identity (IMEI), a radio network temporary identifier (RNTI), a globally-unique temporary identifier (GUTI), etc. The DEG ID(s) may identify DEG(s) associated with the hardware configuration and/or the operational state(s) of the sensing node 504 when performing the measurements. In some aspects, each measurement of the set of measurements is associated with a target ID of a target entity associated with the measurement. For example, the target ID of the target entity for which the measurement is performed may be associated with the measurement. In some aspects, the set of measurements includes a set of channel estimation-based sensing measurements, where the set of measurements are associated with a subset of channel taps.

At 514, the sensing node 504 may transmit, to the network node 502, the set of measurements associated with the sensing node ID and/or DEG ID. For example, the sensing node 504 may transmit a measurement report including the set of measurements.

At 516, the network node 502 may derive a sensing result based at least on the DEG ID. For example, the network node 502 may derive a sensing results based on the frequency offset measurement and the DEG ID associated with the measurement received from the sensing node 504. The sensing result may include cancelling (e.g., removing) the oscillator error associated with the sensing node 504 generated during the frequency offset determination by the sensing node 504.

In some aspects, based on the DEG ID(s) reported by the sensing node 504, the network node 502 may perform one or more advanced schemes to cancel the oscillator error. One advanced scheme is differential Doppler-based RF sensing. For example, at 516, the network node 502 may transmit, to the sensing node 504, a request that indicates a particular DEG ID of the DEG ID(s) reported by the sensing node 504 (e.g., the same DEG ID that was utilized to perform the measurements at 512). This implicitly requests the sensing node 504 to use the same hardware configuration and/or operational state for performing measurements and providing a measurement report. Based on the request, the sensing node 504 performs a second set of measurements utilizing the same hardware configuration and/or operational state and provides a second set of measurements associated with the requested DEG ID to the network node 502. The network node 502 calculates a FDOA based on the second set of measurements and the first set of measurements received at 514. For example, the network node 502 may derive the sensing result by averaging a normalized version of the frequency offset provided via the first set of measurements (provided at 514) and a normalized version of the frequency offset provided via the second set of measurements, which cancels the oscillator error of the sensing node 504.

In some aspects, another advanced scheme is RF bistatic sensing. For example, at 516, the network node 502 may identify that the DEG ID for which the set of measurements was received at 514 indicates that the sensing node 504 utilizes the same oscillator for a transmission of sensing signals and a reception of the sensing signals. In response to identifying such a DEG ID, the network node 502 may derive the sensing result based on a first frequency offset measurement of the set of measurements and a second frequency offset measurement of the set of measurements, where the first frequency offset measurement is based on a downlink sensing signal of the sensing node 504 (e.g., a sensing signal transmitted by the sensing node 504) and the second frequency offset measurement is based on an uplink sensing signal of the sensing node 504 (e.g., a sensing signal received by the sensing node 504). For instance, the sensing node may transmit a downlink sensing signal that is reflected by the target entity and received by a second sensing node, which measures a first frequency offset that includes an oscillator error from the transmission of the sensing signal and a Doppler shift from the target entity. The sensing node 504 may also receive and measure a second frequency offset of a sensing signal transmitted by the second sensing node, reflected by the target object, and received by the sensing node 504 (e.g., as an uplink sensing signal), which includes a second frequency offset that includes an oscillator error from the reception of the sensing signal and a Doppler shift from the target entity. The sensing result of the target entity may be estimated based on a combination (e.g., average) of the first and second frequency offsets (e.g., normalized versions of the first and second frequency offsets), which cancels the oscillator error caused by the sensing node 504.

In some aspects, the sensing result includes information indicative of at least one of a change of an environment associated with the set of measurements, at least one physiological characteristic of a target entity (e.g., a heart rate, a respiration rate, body temperature, etc.) associated with the set of measurements, a location of the target entity, a velocity of the target entity, or a heading of the target entity.

Figure 6:
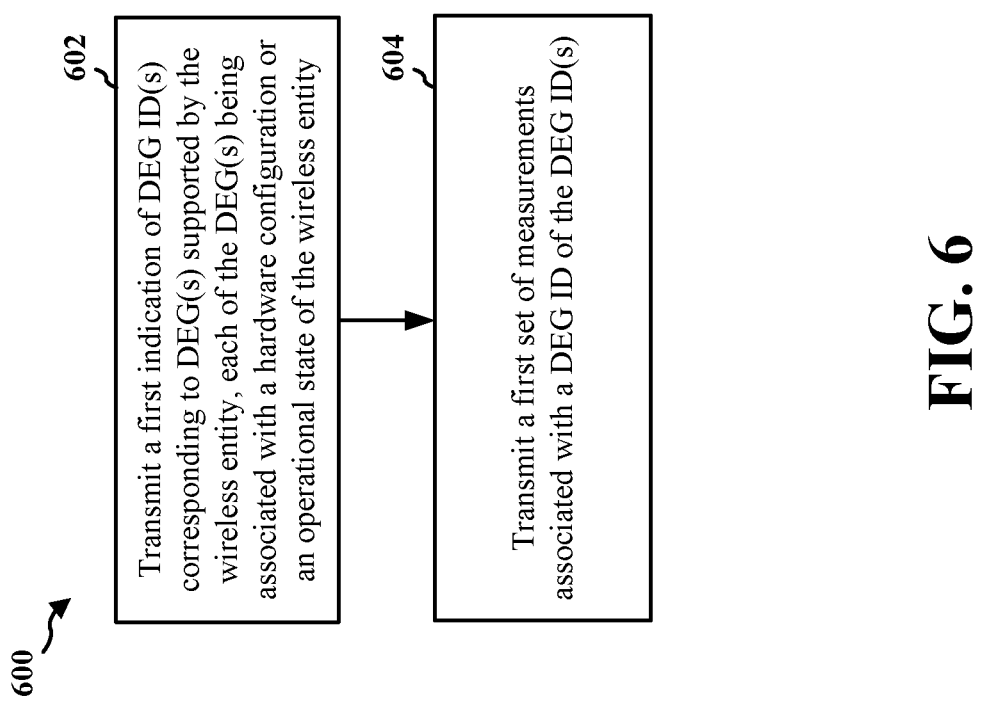
FIG. 6 is a flowchart illustrating a method of wireless communication at a wireless entity in accordance with various aspects of this present disclosure.

FIG. 6 is a flowchart 600 illustrating methods of wireless communication at a wireless entity in accordance with various aspects of the present disclosure. In some aspects, the wireless entity may be the UE 104, 350, or 404, the sensing node 504, or the apparatus 804 in the hardware implementation of FIG. 8.

At 602, the wireless entity may transmit a first indication of DEG ID(s) corresponding to DEG(s) supported by the wireless entity, each of the DEG(s) being associated with a hardware configuration or an operational state of the wireless entity. For example, referring to FIG. 6, the sensing node 504, at 508, may transmit an indication of DEG ID(s) corresponding to DEG(s) supported by the sensing node 504, each of the DEG(s) being associated with a hardware configuration or an operational state of the sensing node 504. In an aspect, 602 may be performed by the DEG transmission component 198.

In some aspects, the hardware configuration may correspond to at least one of a first oscillator utilized by the wireless entity for a transmission of sensing signals or a second oscillator utilized by the wireless entity for a reception of the sensing signals. For example, referring to FIG. 8, the hardware configuration of the sensing node 504 may correspond to at least one of a first oscillator utilized by the sensing node 504 for a transmission of sensing signals or a second oscillator utilized by the sensing node 504 for a reception of the sensing signals.

In some aspects, the operational state may correspond to at least one of a power state of the wireless entity or a temperature of the wireless entity. For example, referring to FIG. 5, the operational state of the sensing node 504 may correspond to at least one of a power state of the sensing node 504 or a temperature of the sensing node 504.

In some aspects, the wireless entity may transmit a second indication of a maximum number of DEGs supported by the wireless entity. For example, referring to FIG. 5, the sensing node 504, at 506, may transmit an indication of a maximum number of DEGs supported by the sensing node 504.

In some aspects, a number of the DEG ID(s) may be less than the maximum number of DEGs supported by the wireless entity. For example, referring to FIG. 5, the number of the DEG ID(s) transmitted at 508 by the sensing node 504 may be less than the maximum number of DEGs supported by the sensing node 504.

At 604, the wireless entity may transmit a first set of measurements associated with a DEG ID of the DEG ID(s). For example, referring to FIG. 5, the sensing node 504, at 514, may transmit a first set of measurements associated with a DEG ID of the DEG ID(s). In an aspect, 604 may be performed by the DEG transmission component 198. In some aspects, the wireless entity may associate a wireless entity ID of the wireless entity with the first set of measurements. For example, referring to FIG. 5, the sensing node 504, at 512, may associate an ID of the sensing node 504 with the first set of measurements.

In some aspects, the wireless entity may associate each measurement of the first set of measurements with a target ID of a target entity associated with the measurement. For example, referring to FIG. 5, the sensing node 504, at 512, may associate each measurement of the first set of measurements with a target ID of a target entity associated with the measurement.

In some aspects, the first set of measurements may include a set of channel estimation-based sensing measurements. For example, referring to FIG. 5, the first set of measurements transmitted at 514 may include a set of channel estimation-based sensing measurements.

In some aspects, the wireless entity may receive, from a network entity, a request that indicates a particular DEG ID of the DEG(s). The wireless entity may transmit, for the network entity, a second set of measurements associated with the particular DEG ID. For example, referring to FIG. 5, as part of 516, the sensing node 504 may receive, from the network node 502, a request that indicates a particular DEG ID of the DEG(s). The request may be to trigger differential Doppler based RF sensing at the network node 502. In response to the request, the sensing node 504 may transmit, to the network node 502, a second set of measurements associated with the particular DEG ID. The network node 502 may, at 516, derive the sensing result based on the set of measurements received at 514 and the set of measurements received in response to the request transmitted by the network node 502.

In some aspects, the network entity may be a network node, a base station, or a SnMF. For example, referring to FIGS. 1 and 3-5, the network entity may be the base station 102, the SnMF 167, the base station 310, the TRP 402, the TRP 406, or network node 502.

In some aspects, the DEG ID of the DEG ID(s) may indicate that the wireless entity utilizes a same oscillator for a transmission of sensing signals and a reception of the sensing signals. The first set of measurements may include a first frequency offset measurement of the first set of measurements and a second frequency offset measurement of the first set of measurements, the first frequency offset measurement being based on a downlink sensing signal transmitted by the wireless entity and the second frequency offset measurement being based on an uplink sensing signal received by the wireless entity. For example, referring to FIG. 5, the DEG ID transmitted at 508 may indicate that the sensing node 504 utilizes a same oscillator for a transmission of sensing signals and a reception of the sensing signals. Such a DEG may trigger RF bistatic sensing at the network node 502. The set of measurements transmitted at 514 may include a first frequency offset measurement of the set of measurements and a second frequency offset measurement of the set of measurements, the first frequency offset measurement being based on a downlink sensing signal transmitted by the sensing node 504 and the second frequency offset measurement being based on an uplink sensing signal received by the sensing node 504. The network node 502 may, at 516, derive the sensing result based on the first frequency offset measurement and the second frequency offset measurement.

Figure 7:
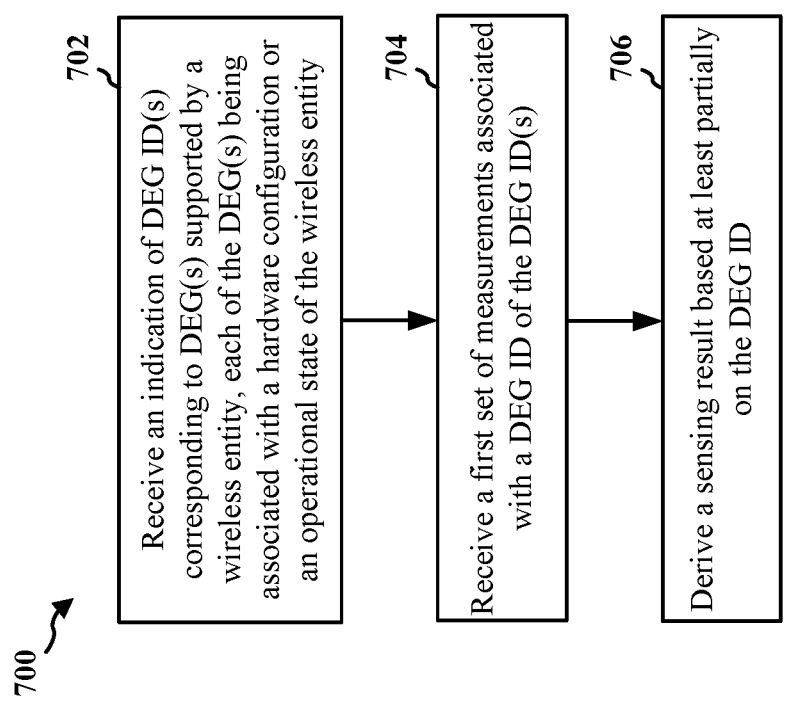
FIG. 7 is a flowchart illustrating a method of wireless communication at a network entity in accordance with various aspects of this present disclosure.

FIG. 7 is a flowchart 700 illustrating methods of wireless communication at a network entity in accordance with various aspects of the present disclosure. In some aspects, the network entity may be the base station 102, the SnMF 167, the base station 310, the TRP 402, the TRP 406, the network node 502, the network entity 902 in the hardware implementation of FIG. 9, or the network entity 1060 in the hardware implementation of FIG. 10.

At 702, the network entity may receive an indication of DEG ID(s) corresponding to DEG(s) supported by a wireless entity, each of the DEG(s) being associated with a hardware configuration or an operational state of the wireless entity. For example, referring to FIG. 5, the network node 502, at 508, may receive an indication of DEG ID(s) corresponding to DEG(s) supported by the sensing node 504, each of the DEG(s) being associated with a hardware configuration or an operational state of the sensing node 504. In an aspect, 702 may be performed by the DEG reception component 199.

In some aspects, the wireless entity may be a sensing node. For example, referring to FIG. 5, the wireless entity may be the sensing node 504.

In some aspects, the hardware configuration may correspond to at least one of a first oscillator utilized by the wireless entity for a transmission of sensing signals or a second oscillator utilized by the wireless entity for a reception of the sensing signals. For example, referring to FIG. 5, the hardware configuration of the sensing node 504 may correspond to at least one of a first oscillator utilized by the sensing node 504 for a transmission of sensing signals or a second oscillator utilized by the sensing node 504 for a reception of the sensing signals.

In some aspects, the operational state may correspond to at least one of a power state of the wireless entity or a temperature of the wireless entity. For example, referring to FIG. 5, the operational state of the sensing node 504 may correspond to at least one of a power state of the sensing node 504 or a temperature of the sensing node 504.

In some aspects, the network entity may receive a second indication of a maximum number of DEGs supported by the wireless entity. For example, referring to FIG. 5, the network node 502, at 506 may receive an indication of a maximum number of DEGs supported by the sensing node 504.

At 704, the network entity may receive a first set of measurements associated with a DEG ID of the DEG ID(s). For example, referring to FIG. 5, the network node 502, at 514, may receive, from the sensing node 504, a first set of measurements associated with a DEG ID of the DEG ID(s). In an aspect, 704 may be performed by the DEG reception component 199.

In some aspects, the first set of measurements may be further associated with a wireless entity ID of the wireless entity. For example, referring to FIG. 5, the first set of measurements received at 514 may be further associated with an ID of the sensing node 504. The sensing node 504, at 512, may associate the ID of the sensing node 504 with the first set of measurements.

In some aspects, each measurement of the first set of measurements may be associated with a target ID of a target entity associated with the measurement. For example, referring to FIG. 5, each measurement of the first set of measurements received at 514 may be associated with a target ID of a target entity associated with the measurement. The sensing node 504, at 516, may associate the target ID with the measurement.

In some aspects, the first set of measurements may include a set of channel estimation-based sensing measurements. For example, referring to FIG. 5, the first set of measurements received at 514 may include a set of channel estimation-based sensing measurements.

At 706, the network entity may derive a sensing result based at least partially on the DEG ID. For example, referring to FIG. 5, the network node 502, at 516, may derive a sensing result based at least partially on the DEG ID. In an aspect, 706 may be performed by the DEG reception component 199.

In some aspects, the network entity may transmit, for a wireless entity, a request that indicates a particular DEG ID of the DEG(s). The network entity may receive a second set of measurements associated with the particular DEG ID. The network entity may calculate a frequency difference of an arrival of the second set of measurements associated with the particular DEG ID. For example, referring to FIG. 5, as part of 516, the network node 502 may transmit, to the sensing node 504 a request that indicates a particular DEG ID of the DEG(s). The request may be to trigger differential Doppler based RF sensing at the network node 502. The network node 502 may receive a second set of measurements associated with the particular DEG ID. The network node 502 may, at 516, derive the sensing result based on the set of measurements received at 514 and the set of measurements received in response to the request transmitted by the network node 502. For example, the network node 502 may, at 516, calculate a frequency difference of an arrival of the second set of measurements associated with the particular DEG ID.

In some aspects, the network entity may identify that the DEG ID of the DEG ID(s) indicates that the wireless entity utilizes a same oscillator for a transmission of sensing signals and a reception of the sensing signals. The network entity may derive, in response to the identification, the sensing result based on a first frequency offset measurement of the first set of measurements and a second frequency offset measurement of the first set of measurements, the first frequency offset measurement being based on a downlink sensing signal of the wireless entity and the second frequency offset measurement being based on an uplink sensing signal of the wireless entity. For example, referring to FIG. 5, the DEG ID received at 508 may indicate that the sensing node 504 utilizes a same oscillator for a transmission of sensing signals and a reception of the sensing signals. Such a DEG may trigger RF bistatic sensing at the network node 502. The set of measurements received at 514 may include a first frequency offset measurement of the set of measurements and a second frequency offset measurement of the set of measurements, the first frequency offset measurement being based on a downlink sensing signal transmitted by the sensing node 504 and the second frequency offset measurement being based on an uplink sensing signal received by the sensing node 504. The network node 502 may, at 516, derive, in response to the identification, the sensing result based on the first frequency offset measurement and the second frequency offset measurement.

In some aspects, the sensing result may include information indicative of at least one of a change of an environment associated with the first set of measurements, at least one physiological characteristic of a target entity associated with the first set of measurements, a location of the target entity, a velocity of the target entity, or a heading of the target entity. For example, referring to FIG. 5, the sensing result derived at 516 may include information indicative of at least one of a change of an environment associated with the first set of measurements, at least one physiological characteristic of a target entity associated with the first set of measurements, a location of the target entity, a velocity of the target entity, or a heading of the target entity.

Figure 8:
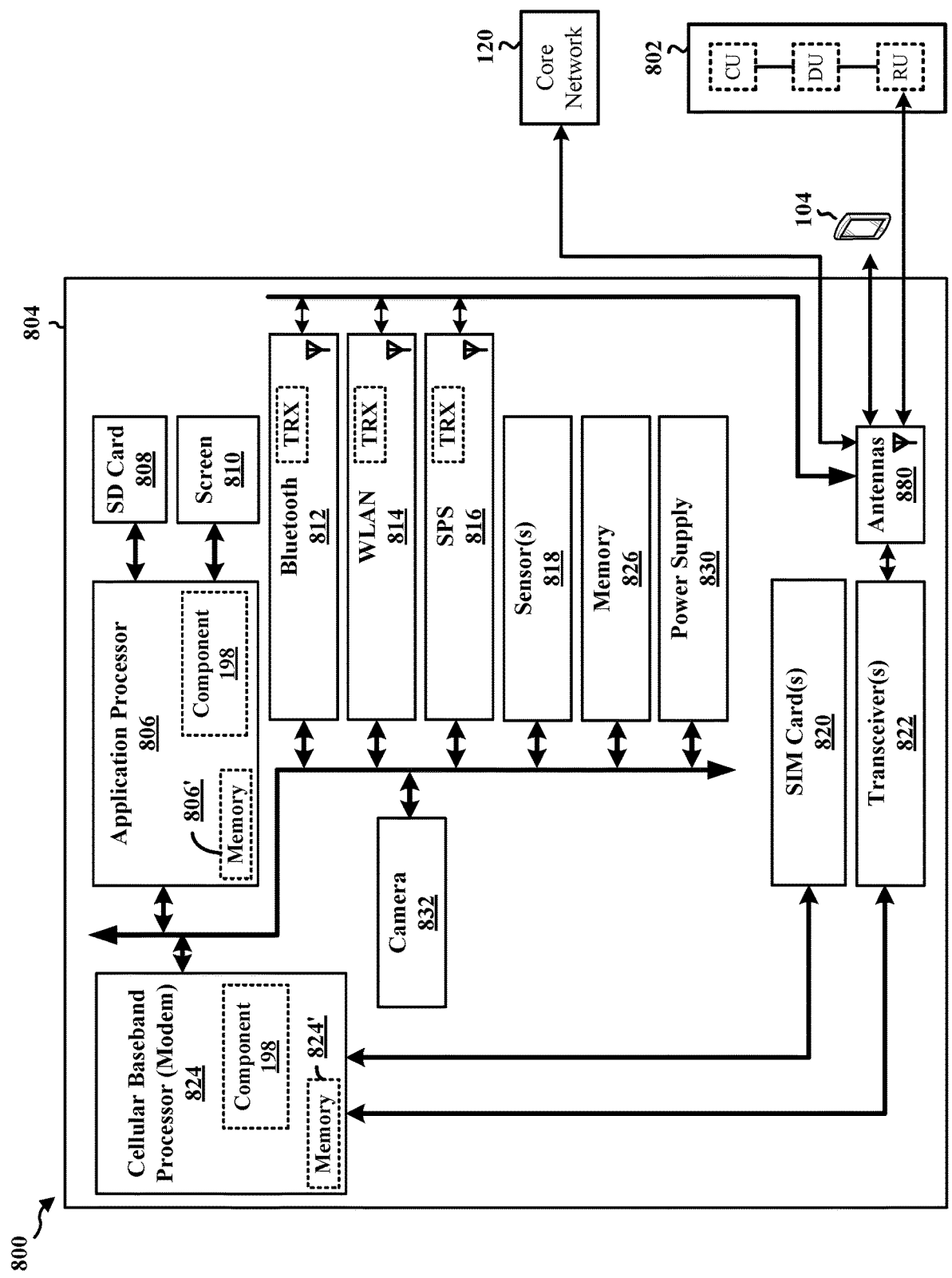
FIG. 8 is a diagram illustrating an example of a hardware implementation for an example apparatus and/or network entity.

FIG. 8 is a diagram 800 illustrating an example of a hardware implementation for an apparatus 804. The apparatus 804 may be a UE, a component of a UE, or may implement UE functionality. In some aspects, the apparatus 804 may include a cellular baseband processor 824 (also referred to as a modem) coupled to one or more transceivers 822 (e.g., cellular RF transceiver). The cellular baseband processor 824 may include on-chip memory 824'. In some aspects, the apparatus 804 may further include one or more subscriber identity modules (SIM) cards 820 and an application processor 806 coupled to a secure digital (SD) card 808 and a screen 810. The application processor 806 may include on-chip memory 806'. In some aspects, the apparatus 804 may further include a Bluetooth module 812, a WLAN module 814, an SPS module 816 (e.g., GNSS module), one or more sensor modules 818 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 826, a power supply 830, and/or a camera 832. The Bluetooth module 812, the WLAN module 814, and the SPS module 816 may include an on-chip transceiver (TRX) (or in some cases, just a receiver (RX)). The Bluetooth module 812, the WLAN module 814, and the SPS module 816 may include their own dedicated antennas and/or utilize the antennas 880 for communication. The cellular baseband processor 824 communicates through the transceiver(s) 822 via one or more antennas 880 with the UE 104, the core network 120, and/or with an RU associated with a network entity 802. The cellular baseband processor 824 and the application processor 806 may each include a computer-readable medium/memory 824', 806', respectively. The additional memory modules 826 may also be considered a computer-readable medium/memory. Each computer-readable medium/memory 824', 806', 826 may be non-transitory. The cellular baseband processor 824 and the application processor 806 are each responsible for general processing, including the execution of software stored on the computer-readable medium/memory. The software, when executed by the cellular baseband processor 824/application processor 806, causes the cellular baseband processor 824/application processor 806 to perform the various functions described supra. The computer-readable medium/memory may also be used for storing data that is manipulated by the cellular baseband processor 824/application processor 806 when executing software. The cellular baseband processor 824/application processor 806 may be a component of the UE 350 and may include the memory 360 and/or at least one of the TX processor 368, the RX processor 356, and the controller/processor 359. In one configuration, the apparatus 804 may be a processor chip (modem and/or application) and include just the cellular baseband processor 824 and/or the application processor 806, and in another configuration, the apparatus 804 may be the entire UE (e.g., see UE 350 of FIG. 3) and include the additional modules of the apparatus 804.

As discussed supra, the component 198 may be configured to transmit a first indication of DEG ID(s) corresponding to DEG(s) supported by the wireless entity, where each of the DEG(s) is associated with a hardware configuration or an operational state of the wireless entity, and to transmit a first set of measurements associated with a DEG ID of the DEG ID(s). The component 198 may be configured to perform any of the aspects described in connection with the flowchart in FIG. 6 and/or the aspects performed by the sensing node 504 in the communication flow in FIG. 5. The component 198 may be within the cellular baseband processor 824, the application processor 806, or both the cellular baseband processor 824 and the application processor 806. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. As shown, the apparatus 804 may include a variety of components configured for various functions. In one configuration, the apparatus 804, and in particular the cellular baseband processor 824 and/or the application processor 806, may include means for transmitting a first indication of DEG ID(s) corresponding to DEG(s) supported by the wireless entity, where each of the DEG(s) is associated with a hardware configuration or an operational state of the wireless entity, and means for transmitting a first set of measurements associated with a DEG ID of the DEG ID(s). The means may be the component 198 of the apparatus 804 configured to perform the functions recited by the means. As described supra, the apparatus 804 may include the TX processor 368, the RX processor 356, and the controller/processor 359. As such, in one configuration, the means may be the TX processor 368, the RX processor 356, and/or the controller/processor 359 configured to perform the functions recited by the means.

Figure 9:
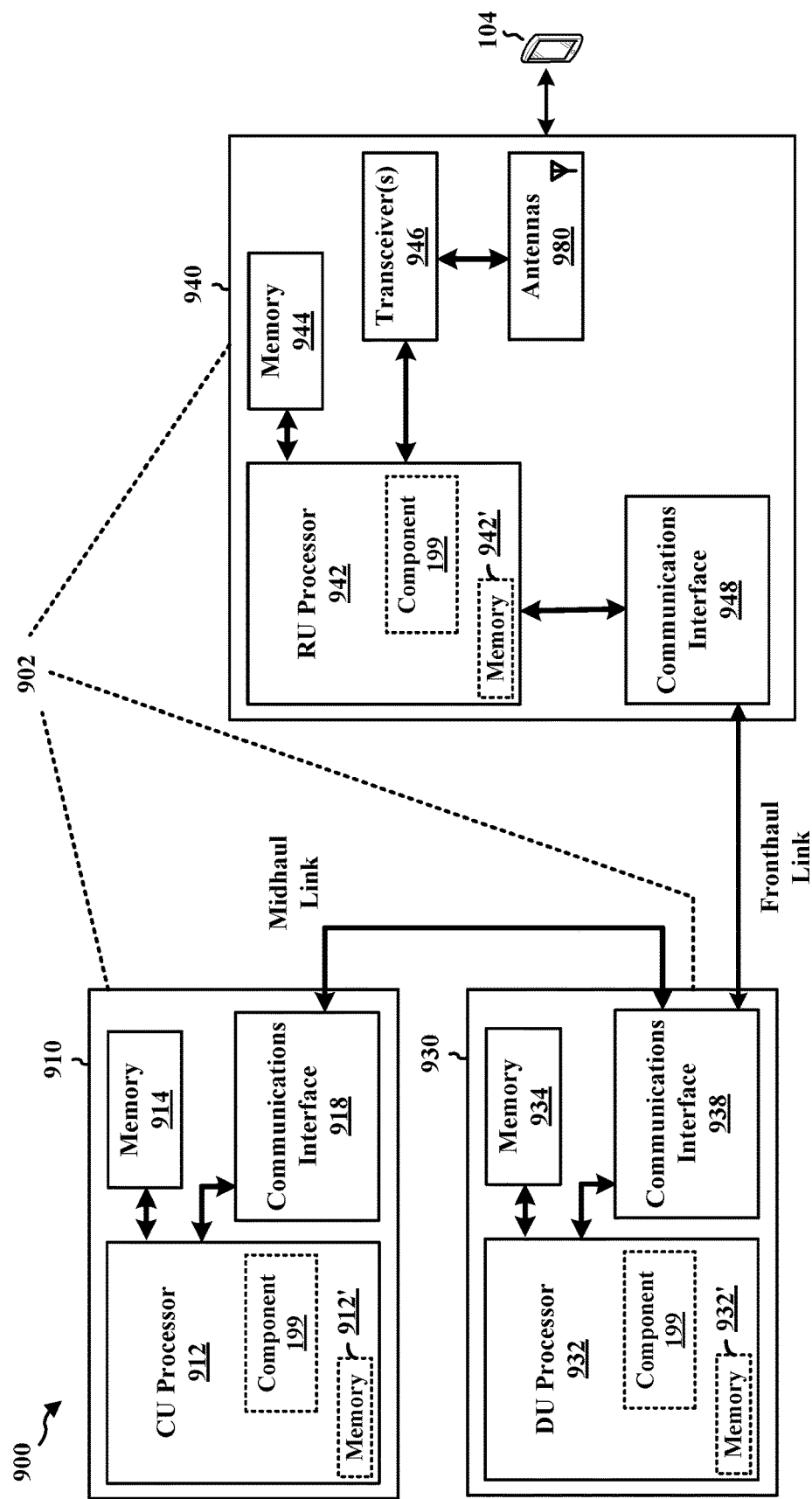
FIG. 9 is a diagram illustrating an example of a hardware implementation for an example network entity.

FIG. 9 is a diagram 900 illustrating an example of a hardware implementation for a network entity 902. The network entity 902 may be a BS, a component of a BS, or may implement BS functionality. The network entity 902 may include at least one of a CU 910, a DU 930, or an RU 940. For example, depending on the layer functionality handled by the component 199, the network entity 902 may include the CU 910; both the CU 910 and the DU 930; each of the CU 910, the DU 930, and the RU 940; the DU 930; both the DU 930 and the RU 940; or the RU 940. The CU 910 may include a CU processor 912. The CU processor 912 may include on-chip memory 912'. In some aspects, the CU 910 may further include additional memory modules 914 and a communications interface 918. The CU 910 communicates with the DU 930 through a midhaul link, such as an F1 interface. The DU 930 may include a DU processor 932. The DU processor 932 may include on-chip memory 932'. In some aspects, the DU 930 may further include additional memory modules 934 and a communications interface 938. The DU 930 communicates with the RU 940 through a fronthaul link. The RU 940 may include an RU processor 942. The RU processor 942 may include on-chip memory 942'. In some aspects, the RU 940 may further include additional memory modules 944, one or more transceivers 946, antennas 980, and a communications interface 948. The RU 940 communicates with the UE 104. The on-chip memory 912', 932', 942' and the additional memory modules 914, 934, 944 may each be considered a computer-readable medium/memory. Each computer-readable medium/memory may be non-transitory. Each of the processors 912, 932, 942 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive an indication of DEG ID(s) corresponding to DEG(s) supported by a wireless entity, where each of the DEG(s) is associated with a hardware configuration or an operational state of the wireless entity, to receive a set of measurements associated with a DEG ID of the DEG ID(s), and to derive a sensing result based at least partially on the DEG ID. The component 199 may be configured to perform any of the aspects described in connection with the flowchart in FIG. 7 and/or the aspects performed by the network node 502 in the communication flow in FIG. 5. The component 199 may be within one or more processors of one or more of the CU 910, DU 930, and the RU 940. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 902 may include a variety of components configured for various functions. In one configuration, the network entity 902 may include means for receiving an indication of DEG ID(s) corresponding to DEG(s) supported by a wireless entity, where each of the DEG(s) is associated with a hardware configuration or an operational state of the wireless entity, means for receiving a set of measurements associated with a DEG ID of the DEG ID(s), and means for deriving a sensing result based at least partially on the DEG ID. The means may be the component 199 of the network entity 902 configured to perform the functions recited by the means. As described supra, the network entity 902 may include the TX processor 316, the RX processor 370, and the controller/processor 375. As such, in one configuration, the means may be the TX processor 316, the RX processor 370, and/or the controller/processor 375 configured to perform the functions recited by the means.

Figure 10:
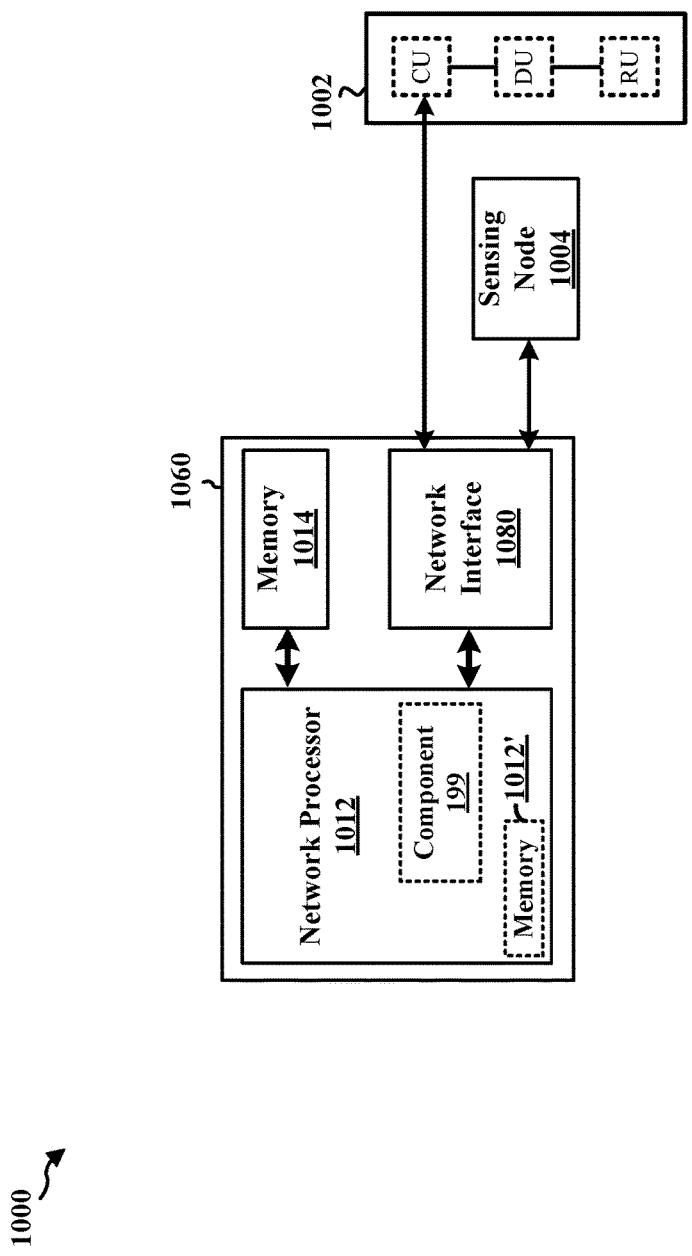
FIG. 10 is a diagram illustrating an example of a hardware implementation for an example network entity.

FIG. 10 is a diagram 1000 illustrating an example of a hardware implementation for a network entity 1060. In one example, the network entity 1060 may be within the core network 120. The network entity 1060 may include a network processor 1012. The network processor 1012 may include on-chip memory 1012'. In some aspects, the network entity 1060 may further include additional memory modules 1014. The network entity 1060 communicates via the network interface 1080 directly (e.g., backhaul link) or indirectly (e.g., through a RIC) with the CU 1002 and the sensing node 1004, which is an example of the sensing node 504. The on-chip memory 1012' and the additional memory modules 1014 may each be considered a computer-readable medium/memory. Each computer-readable medium/memory may be non-transitory. The processor 1012 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive an indication of DEG ID(s) corresponding to DEG(s) supported by a wireless entity, where each of the DEG(s) is associated with a hardware configuration or an operational state of the wireless entity, to receive a set of measurements associated with a DEG ID of the DEG ID(s), and to derive a sensing result based at least partially on the DEG ID. The component 199 may be configured to perform any of the aspects described in connection with the flowchart in FIG. 7 and/or the aspects performed by the network node 502 in the communication flow in FIG. 5. The component 199 may be within the processor 1012. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. The network entity 1060 may include a variety of components configured for various functions. In one configuration, the network entity 1060 may include means for receiving an indication of DEG ID(s) corresponding to DEG(s) supported by a wireless entity, where each of the DEG(s) is associated with a hardware configuration or an operational state of the wireless entity, means for receiving a set of measurements associated with a DEG ID of the DEG ID(s), and means for deriving a sensing result based at least partially on the DEG ID. The means may be the component 199 of the network entity 1060 configured to perform the functions recited by the means.

Various aspects relate generally to positioning systems. Some aspects more specifically relate to RF sensing utilizing one or more Doppler error groups (DEGs). In some examples, a wireless entity (e.g., a sensing node) may provide an indication of one or more DEG identifiers (IDs) corresponding to DEG(s) supported by the wireless entity. Each of the DEG ID(s) indicates a particular hardware configuration (e.g., an indication of one or more oscillators utilized by the wireless entity) and/or an operational state supported by the wireless entity. The wireless entity may perform a set of measurements for a target entity. The wireless entity may provide the set of measurements to a network entity (e.g., a base station, a network node, a sensing management function (SnMF), etc.), along with a particular DEG ID that identifies the DEG (or hardware configuration and/or operational state) utilized when performing the set of measurements. The network entity may derive a sensing result (e.g., a position, a velocity, etc.) for a target entity based at least on the DEG ID (e.g., based on the DEG ID and the set of measurements).

Particular aspects of the subject matter described in this disclosure can be implemented to realize one or more of the following potential advantages. In some examples, by deriving the sensing result based on the DEG ID, the network entity may determine the hardware configuration and/or operational state of the wireless entity and accurately remove the estimation bias caused by the oscillator error associated with the hardware configuration and/or operational state. By doing so, the network entity may more accurately estimate the Doppler shift of the target entity, and therefore, more accurately determine a sensing result for the target entity.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a network entity, including receiving an indication of DEG ID(s) corresponding to DEG(s) supported by a wireless entity, where each of the DEG(s) is associated with a hardware configuration or an operational state of the wireless entity, receiving a first set of measurements associated with a DEG ID of the DEG ID(s), and deriving a sensing result based at least partially on the DEG ID.

Aspect 2 is the method of aspect 1, further including: transmitting, for the wireless entity, a request that indicates a particular DEG ID of the DEG ID(s), receiving a second set of measurements associated with the particular DEG ID, and calculating a frequency difference of an arrival of the second set of measurements associated with the particular DEG ID.

Aspect 3 is the method of any of aspects 1 and 2, further including: identifying that the DEG ID of the DEG ID(s) indicates that the wireless entity utilizes a same oscillator for a transmission of sensing signals and a reception of the sensing signals.

Aspect 4 is the method of any of aspects 1 to 3, where the first set of measurements is further associated with a wireless entity ID of the wireless entity.

Aspect 5 is the method of any of aspects 1 to 4, where the sensing result includes first information indicative of at least one of: a change of an environment associated with the first set of measurements; at least one physiological characteristic of a target entity associated with the first set of measurements; a location of the target entity; a velocity of the target entity; or a heading of the target entity.

Aspect 6 is the method of any of aspects 1 to 5, where the hardware configuration corresponds to: at least one of a first oscillator utilized by the wireless entity for a transmission of sensing signals or a second oscillator utilized by the wireless entity for a reception of the sensing signals.

Aspect 7 is the method of any of aspects 1 to 6, where the operational state corresponds to at least one of: a power state of the wireless entity; or a temperature of the wireless entity.

Aspect 8 is the method of any of aspects 1 to 7, where the first set of measurements includes a set of channel estimation-based sensing measurements.

Aspect 9 is the method of any of aspects 1 to 8, where each measurement of the first set of measurements is associated with a target ID of a target entity associated with the measurement.

Aspect 10 is the method of any of aspects 1 to 9, further including: receiving a second indication of a maximum number of DEGs supported by the wireless entity.

Aspect 11 is the method of any of aspects 1 to 10, where the network entity is a network node, a base station, or a sensing management function, and where the wireless entity is a sensing node.

Aspect 12 is a method of wireless communication at a wireless entity, including: transmitting a first indication of DEG ID(s) corresponding to DEG(s) supported by the wireless entity, where each of the DEG(s) is associated with a hardware configuration or an operational state of the wireless entity; and transmit a first set of measurements associated with a DEG ID of the DEG ID(s).

Aspect 13 is the method of aspect 12, further including: receiving, from a network entity, a request that indicates a particular DEG ID of the DEG(s); and transmitting, for the network entity, a second set of measurements associated with the particular DEG ID.

Aspect 14 is the method of aspect 13, where the network entity is a network node, a base station, or a sensing management function, and where the wireless entity is a sensing node.

Aspect 15 is the method of any of aspects 12 to 14, where the DEG ID of the DEG ID(s) indicates that the wireless entity utilizes a same oscillator for a transmission of sensing signals and a reception of the sensing signals, and where the first set of measurements includes a first frequency offset measurement of the first set of measurements and a second frequency offset measurement of the first set of measurements, where the first frequency offset measurement is based on a downlink sensing signal transmitted by the wireless entity and the second frequency offset measurement is based on an uplink sensing signal received by the wireless entity.

Aspect 16 is the method of any of aspects 12 to 15, further including: associating a wireless entity ID of the wireless entity with the first set of measurements.

Aspect 17 is the method of any of aspects 12 to 16, where the hardware configuration corresponds to: at least one of a first oscillator utilized by the wireless entity for a transmission of sensing signals or a second oscillator utilized by the wireless entity for a reception of the sensing signals.

Aspect 18 is the method of any of aspects 12 to 17, where the operational state corresponds to at least one of: a power state of the wireless entity; or a temperature of the wireless entity.

Aspect 19 is the method of any of aspects 12 to 18, where the first set of measurements includes a set of channel estimation-based sensing measurements.

Aspect 20 is the method of any of aspects 12 to 19, further including: associating each measurement of the first set of measurements with a target ID of a target entity associated with the measurement.

Aspect 21 is the method of any of aspects 12 to 20, further including: transmitting a second indication of a maximum number of DEGs supported by the wireless entity.

Aspect 22 is the method of aspect 21, where a number of the DEG ID(s) is less than the maximum number of DEGs supported by the wireless entity.

Aspect 23 is an apparatus for wireless communication at a network entity. The apparatus includes memory; and at least one processor coupled to the memory and, based at least in part on information stored in the memory, the at least one processor is configured to implement any of aspects 1 to 11.

Aspect 24 is the apparatus of aspect 23, further including at least one of a transceiver or an antenna coupled to the at least one processor.

Aspect 25 is an apparatus for wireless communication at a wireless entity. The apparatus includes memory; and at least one processor coupled to the memory and, based at least in part on information stored in the memory, the at least one processor is configured to implement any of aspects 12 to 22.

Aspect 26 is the apparatus of aspect 25, further including at least one of a transceiver or an antenna coupled to the at least one processor.

Aspect 27 is an apparatus for wireless communication including means for implementing any of aspects 1 to 11.

Aspect 28 is an apparatus for wireless communication including means for implementing any of aspects 12 to 22.

Aspect 29 is a computer-readable medium (e.g., a non-transitory computer-readable medium) storing computer executable code, where the code when executed by a processor causes the processor to implement any of aspects 1 to 11.

Aspect 30 is a computer-readable medium (e.g., a non-transitory computer-readable medium) storing computer executable code, where the code when executed by a processor causes the processor to implement any of aspects 12 to 22.

What is claimed is:

1. An apparatus of wireless communication at a network entity, comprising:
   memory; and
   at least one processor coupled to the memory and, based at least in part on information stored in the memory, the at least one processor is configured to:
      receive an indication of one or more Doppler error group (DEG) identifiers (IDs) corresponding to one or more DEGs supported by a wireless entity, wherein each of the one or more DEGs is associated with a hardware configuration or an operational state of the wireless entity;
      receive a first set of measurements associated with a DEG ID of the one or more DEG IDs; and
      derive a sensing result based at least partially on the DEG ID.

2. The apparatus of claim 1, wherein the at least one processor is further configured to:
   transmit, for the wireless entity, a request that indicates a particular DEG ID of the one or more DEG IDs;
   receive a second set of measurements associated with the particular DEG ID; and
   calculate a frequency difference of an arrival of the second set of measurements associated with the particular DEG ID.

3. The apparatus of claim 1, wherein the at least one processor is further configured to:
   identify that the DEG ID of the one or more DEG IDs indicates that the wireless entity utilizes a same oscillator for a transmission of sensing signals and a reception of the sensing signals; and
   derive, in response to the identification, the sensing result based on a first frequency offset measurement of the first set of measurements and a second frequency offset measurement of the first set of measurements, wherein the first frequency offset measurement is based on a downlink sensing signal of the wireless entity and the second frequency offset measurement is based on an uplink sensing signal of the wireless entity.

4. The apparatus of claim 1, wherein the first set of measurements is further associated with a wireless entity ID of the wireless entity.

5. The apparatus of claim 1, wherein the sensing result comprises first information indicative of at least one of:
   a change of an environment associated with the first set of measurements;
   at least one physiological characteristic of a target entity associated with the first set of measurements;
   a location of the target entity;
   a velocity of the target entity; or
   a heading of the target entity.

6. The apparatus of claim 1, wherein the hardware configuration corresponds to:
   at least one of a first oscillator utilized by the wireless entity for a transmission of sensing signals or a second oscillator utilized by the wireless entity for a reception of the sensing signals.

7. The apparatus of claim 1, wherein the operational state corresponds to at least one of:
   a power state of the wireless entity; or
   a temperature of the wireless entity.

8. The apparatus of claim 1, wherein the first set of measurements comprises a set of channel estimation-based sensing measurements.

9. The apparatus of claim 1, wherein each measurement of the first set of measurements is associated with a target ID of a target entity associated with the measurement.

10. The apparatus of claim 1, wherein the at least one processor is further configured to:
    receive a second indication of a maximum number of DEGs supported by the wireless entity.

11. The apparatus of claim 1, wherein the network entity is a network node, a base station, or a sensing management function, and wherein the wireless entity is a sensing node.

12. An apparatus of wireless communication at a wireless entity, comprising:
    memory; and
    at least one processor coupled to the memory and, based at least in part on information stored in the memory, the at least one processor is configured to:
       transmit a first indication of one or more Doppler error group (DEG) identifiers (IDs) corresponding to one or more DEGs supported by the wireless entity, wherein each of the one or more DEGs is associated with a hardware configuration or an operational state of the wireless entity; and
       transmit a first set of measurements associated with a DEG ID of the one or more DEG IDs.

13. The apparatus of claim 12, wherein the at least one processor is further configured to:
    receive, from a network entity, a request that indicates a particular DEG ID of the one or more DEGs; and
    transmit, for the network entity, a second set of measurements associated with the particular DEG ID.

14. The apparatus of claim 13, wherein the network entity is a network node, a base station, or a sensing management function, and wherein the wireless entity is a sensing node.

15. The apparatus of claim 12, wherein the DEG ID of the one or more DEG IDs indicates that the wireless entity utilizes a same oscillator for a transmission of sensing signals and a reception of the sensing signals, and wherein the first set of measurements comprises a first frequency offset measurement of the first set of measurements and a second frequency offset measurement of the first set of measurements, wherein the first frequency offset measurement is based on a downlink sensing signal transmitted by the wireless entity and the second frequency offset measurement is based on an uplink sensing signal received by the wireless entity.

16. The apparatus of claim 12, wherein the at least one processor is further configured to:
associate a wireless entity ID of the wireless entity with the first set of measurements.

17. The apparatus of claim 12, wherein the hardware configuration corresponds to:
at least one of a first oscillator utilized by the wireless entity for a transmission of sensing signals or a second oscillator utilized by the wireless entity for a reception of the sensing signals.

18. The apparatus of claim 12, wherein the operational state corresponds to at least one of:
a power state of the wireless entity; or
a temperature of the wireless entity.

19. The apparatus of claim 12, wherein the first set of measurements comprises a set of channel estimation-based sensing measurements.

20. The apparatus of claim 12, wherein the at least one processor is further configured to:
associate each measurement of the first set of measurements with a target ID of a target entity associated with the measurement.

21. The apparatus of claim 12, wherein the at least one processor is further configured to:
transmit a second indication of a maximum number of DEGs supported by the wireless entity.

22. The apparatus of claim 21, wherein a number of the one or more DEG IDs is less than the maximum number of DEGs supported by the wireless entity.

23. A method of wireless communication at a network entity, comprising:
receiving an indication of one or more Doppler error group (DEG) identifiers (IDs) corresponding to one or more DEGs supported by a wireless entity, wherein each of the one or more DEGs is associated with a hardware configuration or an operational state of the wireless entity;
receiving a first set of measurements associated with a DEG ID of the one or more DEG IDs; and
deriving a sensing result based at least partially on the DEG ID.

24. The method of claim 23, further comprising:
transmitting, for the wireless entity, a request that indicates a particular DEG ID of the one or more DEG IDs;
receiving a second set of measurements associated with the particular DEG ID; and
calculating a frequency difference of an arrival of the second set of measurements associated with the particular DEG ID.

25. The method of claim 23, further comprising:
identifying that the DEG ID of the one or more DEG IDs indicates that the wireless entity utilizes a same oscillator for a transmission of sensing signals and a reception of the sensing signals; and
deriving, in response to the identification, the sensing result based on a first frequency offset measurement of the first set of measurements and a second frequency offset measurement of the first set of measurements, wherein the first frequency offset measurement is based on a downlink sensing signal of the wireless entity and the second frequency offset measurement is based on an uplink sensing signal of the wireless entity.

26. The method of claim 23, wherein the first set of measurements is further associated with a wireless entity ID of the wireless entity.

27. A method of wireless communication at a wireless entity, comprising:
transmitting a first indication of one or more Doppler error group (DEG) identifiers (IDs) corresponding to one or more DEGs supported by the wireless entity, wherein each of the one or more DEGs is associated with a hardware configuration or an operational state of the wireless entity; and
transmitting a first set of measurements associated with a DEG ID of the one or more DEG IDs.

28. The method of claim 27, further comprising:
receiving, from a network entity, a request that indicates a particular DEG ID of the one or more DEGs; and
transmitting, for the network entity, a second set of measurements associated with the particular DEG ID.

29. The method of claim 28, wherein the network entity is a network node, a base station, or a sensing management function, and wherein the wireless entity is a sensing node.

30. The method of claim 27, wherein the DEG ID of the one or more DEG IDs indicates that the wireless entity utilizes a same oscillator for a transmission of sensing signals and a reception of the sensing signals, and wherein the first set of measurements comprises a first frequency offset measurement of the first set of measurements and a second frequency offset measurement of the first set of measurements, wherein the first frequency offset measurement is based on a downlink sensing signal transmitted by the wireless entity and the second frequency offset measurement is based on an uplink sensing signal received by the wireless entity.

\* \* \* \* \*